L. L. WHITLOCK.
Devices for Reversing Motion.
No. 148,865. Patented March 24, 1874.
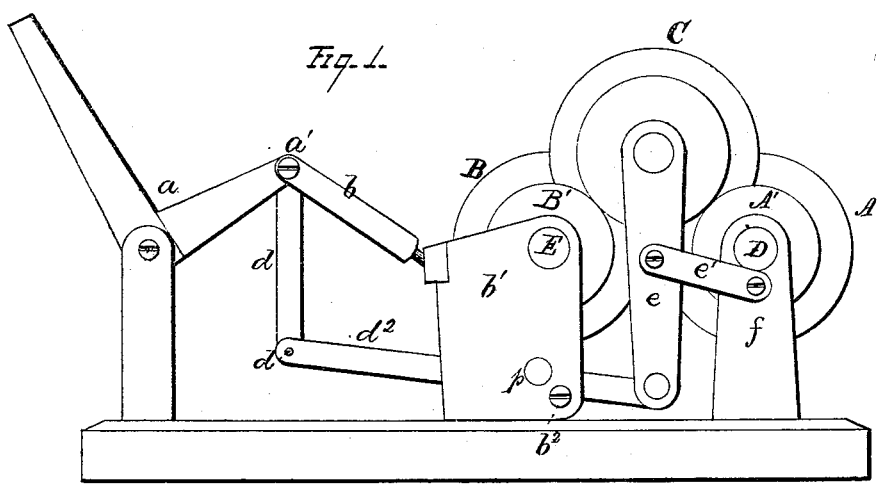
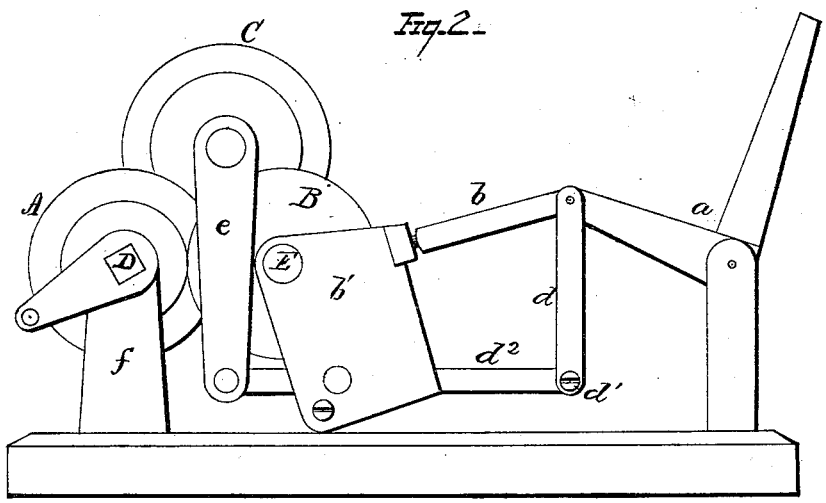

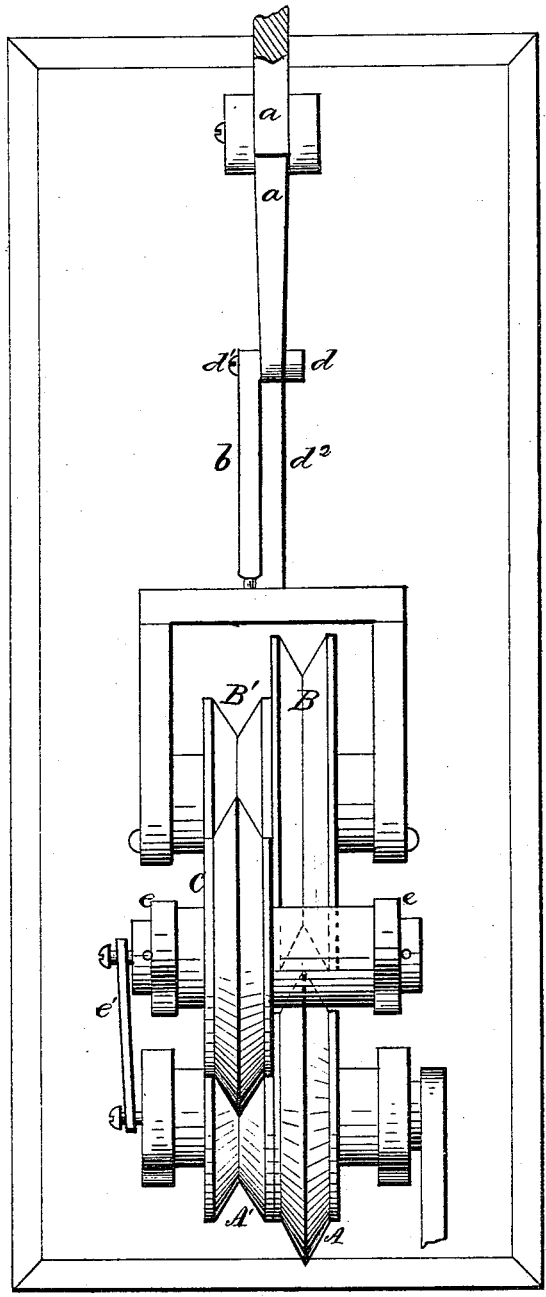

UNITED STATES PATENT OFFICE.

LEWIS L. WHITLOCK, OF BROOKLYN, NEW YORK.

IMPROVEMENT IN DEVICES FOR REVERSING MOTION.

Specification forming part of Letters Patent No. 148,865, dated March 24, 1874; application filed December 27, 1873.

CASE A.

*To all whom it may concern:*

Be it known that I, LEWIS L. WHITLOCK, of Brooklyn, in the county of Kings and State of New York, have invented certain new and useful Improvements in Devices for Reversing Motion; and I do hereby declare the following to be a full, clear, and exact description of the invention, such as will enable others skilled in the art to which it pertains to make and use it, reference being had to the accompanying drawings, which form part of this specification.

My invention relates to a device for reversing motion.

In the drawings, Figure 1 represents a side elevation of my invention, representing the same when the intermediate wheel C is employed and the wheels A B travel in the same direction. Fig. 2 represents a side elevation of my invention when the intermediate wheel C is idle and the wheels A B travel in opposite directions. Fig. 3 represents a plan view of my invention.

My invention consists in the devices and combinations as hereinafter specified and claimed, wherein—

$a$ is a lever of suitable construction, pivoted at $a'$ to the connection $b$, forming a knuckle-joint, operating the rocker-box $b^1$, swinging upon the pivot $b^2$. From the joint $a'$ proceeds another connection, $d$, joined at $d^1$ to the lever $d^2$, fulcrumed at $p$ in the rocker-box $b^1$, and operating the intermediate wheel C through the connection $e$. $e'$ is a link, connecting the standard $f$ of the wheel A with that of the intermediate wheel C, serving as a guide to the wheel C during its operation. In the rocker-box $b^1$ are journaled the friction-wheels B B'. Between the friction-wheels B' and A' is placed the intermediate friction-wheel C, operated by the device $a\ b\ d\ d^2\ e$, and whose center is above the centers of the wheels A B.

Supposing power to be applied to the shaft D, and the machinery to be operated driven by the shaft E, if it is desired that the two shafts should travel in opposite directions, the wheels A B are thrown directly in contact, and the intermediate wheel C remains idle, as indicated in Fig. 2 of the drawing. This is accomplished by throwing the rocker-box $b^1$ forward, and the intermediate wheel C upward by the lever $a$ and its connections, thus carrying the friction-wheel B into contact with the wheel A.

Should it be desired to reverse the motion of the shaft D and make it travel in the same direction as the shaft E, the lever $a$ is reversed, thereby separating the wheels A B, engaging the intermediate friction-wheel C with the wheels A' B', as indicated in Fig. 1 of the drawings.

In the drawings, the pulleys B B' are represented as single castings, likewise the pulleys A A.

I do not limit myself to this construction, inasmuch as the wheels B B' may be separate upon the shaft E, and the wheels A A' likewise separate upon the shaft D. Neither do I narrowly limit myself to the device herein shown, whereby the wheels A A' B B' are separated or brought together, and the wheel C engaged with or detached from the wheels A' B' by the operation of the lever $a$; but

What I claim as my invention is—

1. The combination, with two V friction-wheels, one attached to the driving mechanism and one to the machinery to which motion is to be communicated, of an intermediate movable V friction-wheel, disconnected from the center of both said wheels, and arranged to be thrown into or lifted entirely out of gear with both of them simultaneously, as and for the purposes set forth.

2. The combination, with a stationary V friction-wheel, of a tilting V friction-wheel, adjusted to be thrown in and out of gear therewith, and an intermediate V friction-wheel, disconnected from the said wheels, and arranged to be thrown into gear with both of them when separated, in order to reverse the motion of that wheel to which the machinery to be driven is attached, substantially as and for the purposes set forth.

3. In combination with two V friction-wheels, A and B, that have given relative diameters, separate V-bearings A' B' on the same shafts, of any desired diameters, and an adjustable intermediate V friction-wheel, arranged to be brought into gear with the bearings A' B', by which the reverse motion may be given any desired speed, substantially as set forth.

4. The lever $a$ and its connections, in combination with the tilting wheel B and intermediate wheel C, arranged to operate both said wheels simultaneously, substantially as set forth.

In testimony that I claim the foregoing I have hereunto set my hand this 24th day of December, 1873.

LEWIS L. WHITLOCK.

Witnesses:
 J. TYLER POWELL,
 W. H. BRERETON, Jr.